US011732065B2

(12) United States Patent
Hu et al.

(10) Patent No.: US 11,732,065 B2
(45) Date of Patent: Aug. 22, 2023

(54) CHROMIUM-ON-SILICA CATALYSTS AND METHODS OF MAKING THE SAME

(71) Applicants: Yatao Rachel Hu, Malvern, PA (US); Parag Rasiklal Shah, Lafayette Hill, PA (US); David George Collopy, Cheshire (GB); Robert Joseph Parker, Cheshire (GB); Myoung Kie Lee, King of Prussia, PA (US)

(72) Inventors: Yatao Rachel Hu, Malvern, PA (US); Parag Rasiklal Shah, Lafayette Hill, PA (US); David George Collopy, Cheshire (GB); Robert Joseph Parker, Cheshire (GB); Myoung Kie Lee, King of Prussia, PA (US)

(73) Assignee: PQ Corporation, Valley Forge, PA (US)

( * ) Notice: Subject to any disclaimer, the term of this patent is extended or adjusted under 35 U.S.C. 154(b) by 0 days.

(21) Appl. No.: 16/804,610

(22) Filed: Feb. 28, 2020

(65) Prior Publication Data
US 2021/0269562 A1    Sep. 2, 2021

(51) Int. Cl.
*C08F 10/02* (2006.01)
*C08F 4/22* (2006.01)

(52) U.S. Cl.
CPC .................... *C08F 10/02* (2013.01)

(58) Field of Classification Search
CPC .................... C08F 4/22; C08F 10/02
See application file for complete search history.

(56) References Cited

U.S. PATENT DOCUMENTS 7,074,376 B2 *   7/2006   Katsuro ............... C01B 33/163
                                                              423/338
8,022,124 B2 *   9/2011   Rohde .................. C08F 110/02
                                                              524/154
2005/0047985 A1  3/2005   Mori

FOREIGN PATENT DOCUMENTS

| CN | 108912257 A * | 11/2018 | |
| EP | 0 137 258 A2 | 4/1985 | |
| JP | 2003/192713 A | 7/2003 | |
| JP | 2020000998 A * | 1/2020 | |
| WO | WO-2010115613 A1 * | 10/2010 | .............. C08F 10/02 |

(Continued)

OTHER PUBLICATIONS

Machine translation of JP 2020-000998A. (Year: 2020).*

(Continued)

*Primary Examiner* — Catherine S Branch
(74) *Attorney, Agent, or Firm* — Finnegan, Henderson, Farabow, Garrett & Dunner, LLP

(57) ABSTRACT

A composition, such as a catalyst precursor or a catalyst comprising a Cr coated silica support with particularly defined levels of Na and Al, such that the resulting Cr/Silica catalyst has an increased MI potential is disclosed. In an embodiment, the disclosed catalyst composition comprises a silica-containing substrate made using a base-set gel and comprising a catalytically active metal consisting of Cr, with Al impurities of less than 50 ppm and Na in an amount of less than 800 ppm of the catalyst composition. The disclosed composition has an increased MI potential over a catalyst having higher Al content, a lower Na:Al ratio, or both. Methods of making the disclosed composition, and methods of using it to prepare a polyethylene are also disclosed.

15 Claims, 3 Drawing Sheets

(56) References Cited

FOREIGN PATENT DOCUMENTS

WO  WO 2011/161412      12/2011
WO  WO 2013/081826 A1   6/2013

OTHER PUBLICATIONS

Machine translation of Du et al. (CN 108912257A) (Year: 2018).*
International Search Report for PCT/US2020/020323 dated Oct. 27, 2020.

* cited by examiner

CHROMIUM-ON-SILICA CATALYSTS AND METHODS OF MAKING THE SAME

The present disclosure generally relates to silica catalysts for polyethylene production. More particularly, the present disclosure relates to Chromium/Silica (Cr/SiO$_2$) catalysts used for the production of high density polyethylene (HDPE). Methods of making such catalyst using base-set gels and methods of using such catalysts in HDPE applications, particularly small blow molding HDPE applications, are also disclosed.

BACKGROUND

The production of polyethylene, such as high density polyethylene (HDPE), is a multi-billion dollar industry that typically utilizes supported catalyst in a polymerization process. In particular, supported chromium oxide catalysts used in the industry generally comprise chromium oxide and supports containing one or more of silica, titania, thoria, alumina, zirconia or aluminophosphates.

One particularly useful catalyst is referred to as a Phillips-type catalyst, which comprises chromium oxide supported on silica gel (e.g. Cr/SiO$_2$). This type of catalyst is a popular polymerization catalyst for the production of HDPE, primarily because it produces HDPE with a broad molecular weight distribution, which is particularly suitable for blow molding applications. Commercial silica supports for Phillips-type catalysts are typically produced from inorganic silicate, with sodium silicate being most widely used. As a result, commercial Phillips-type catalysts have varying levels of sodium impurity depending on the washing procedure employed to produce the silica supports.

Addition of high amounts of alkali or alkaline earth salts to a chromium oxide catalyst has been found to increase the catalyst's melt index ("MI") potential and activity when the catalyst is activated at temperature below its sintering temperature. For example, U.S. Pat. Nos. 5,444,132 and 5,284,811, both to Witt et al., disclose impregnating a silica-titania or aluminophosphate support (that was previously purified to remove alkali metal salt by-products resulting from support manufacturing) with 50-500 µmol alkaline or alkaline earth metal salt per gram of catalyst, which is equivalent to 1,150-11,500 ppm Na in the catalyst, using a non-aqueous impregnation solution. However, this large amount of Na will cause catalyst sintering at 750-850° C., which is the typical activation temperature used for small blow molding (SBM) resin production.

Other studies have shown similar effect of alkali metal doping on the performance of Cr/silica catalysts in ethylene polymerization. In one such study, the lowest Na content disclosed is 0.2 mmol/g catalyst, which is equivalent to 4,600 ppm Na. See, e.g., J. Catal., Vol 176, 344-351 (1998). Addition of sodium in these levels, while increasing the MI potential of catalyst activated at lower temperatures, sinters the catalyst at higher activation temperature thus reducing catalyst MI potential. The maximum MI achievable with these high levels of Na doping at any given activation temperature is lower than that with catalyst without Na doping but activated at higher temperature.

The prior art focusing on increasing catalyst MI potential often teaches the effects of high levels of Al in the finished catalyst but fails to recognize the effects of Al impurity in the support on the resulting catalyst. For example, studies on supported chromium catalysts describe adding Al to Cr/Silica catalysts to increase the polymer MI. See, Marsden, "Advances in supported chromium catalysts", Plastics, Rubber and Composites Processing and Applications 21 (1994) 193-200; and U.S. Pat. No. 4,119,773. These references describe that the relationship between Al and MI potential is dependent on a number of variables associated with the Al incorporation, including the content, the nature of the Al compound and the way in which it is added.

Cr/Silica catalysts, as described in the foregoing references, are commercially used for the production of HDPE for small blow molding applications. Such catalysts are typically activated at high temperature, such as one ranging from 750-850° C., in order to achieve polymer MI targets. As these activation temperatures are very close to the sintering temperature of the Cr/Silica catalysts, the ability to boost catalyst MI potential by further increasing activation temperature is very limited. Although modifying Cr/Silica catalysts with metals, such as Al and Ti, can substantially increase catalyst MI potential, these modifications also broaden the molecular weight distribution of the HDPE produced as well as increase catalyst manufacturing cost. Both are undesirable for SBM applications.

For at least the foregoing reasons, there is a need for a Cr/Silica catalyst having increased MI potential to allow a sufficiently wide differential between the activation temperature required to achieve resin MI target and its sintering temperature. This increased MI potential will give some flexibility to the catalyst activation and polymerization process without substantially altering the molecular weight distribution of the HDPE produced. Catalyst with increased MI potential will also allow the production of HDPE with MI higher than currently achievable with commercially available Cr/Silica catalysts to meet additional market needs, such as HDPE homopolymers with MI higher than 1.0 g/10 min for SBM applications. To address the foregoing needs, the present application describes a Cr-only catalyst with increased MI potential compared to the catalysts currently on the market for small blow molding HDPE resin production.

SUMMARY

There is disclosed a composition, such as a catalyst precursor, or a catalyst comprising a Cr coated silica support with defined levels of alkali or alkaline earth metals (including for example, Na, Mg, or Ca) and Al exhibiting increased MI potential. In one embodiment, there is disclosed a catalyst composition comprising a Cr coated silica support with defined levels of Na and Al, such that the resulting Cr/Silica catalyst has increased MI potential. In one embodiment, the present application is directed to a catalyst composition comprising a silica-containing substrate comprising a catalytically active metal consisting of Cr. In one embodiment, the catalyst comprises Al in an amount of less than 50 ppm and Na in an amount of less than 800 ppm of the catalyst composition. In one embodiment, the amounts of Na and Al are present in a Na:Al molar ratio greater than 5, greater than 10, greater than 20, even greater than 30, such as a molar ratio ranging from 10-40. It is appreciated that the molar ratio may comprise any combination of these end points, such as a range of 5 to 10, 5 to 20, 5 to 30, and the like, or 5 to 40, 10 to 40, 20 to 40, or other combinations thereof.

There is also disclosed a method for preparing the disclosed composition comprising a Cr coated support with particularly defined levels of Na and Al, such that the resulting Cr/Silica catalyst exhibits increased MI potential. In one embodiment, the method comprises reacting a metal silicate, such as sodium silicate, with an acid to form a hydrosol that transforms into a hydrogel precursor and substantially leaching the Al impurity associated with the sodium silicate by washing to reduce the amount of Al impurity to an amount of less than 50 ppm in the resulting catalyst precursor.

The method further comprises ageing the hydrogel precursor to form a hydrogel having a surface area greater than 200 m$^2$/g, such as greater than 250 m$^2$/g. In one embodiment the hydrogel exhibits a surface area of approximately 300 m$^2$/g. The aging process comprises mixing the hydrogel precursor with a neutral or basic aqueous solution to form an aqueous dispersion exhibiting neutral or basic pH.

DETAILED DESCRIPTION

Figure 1:
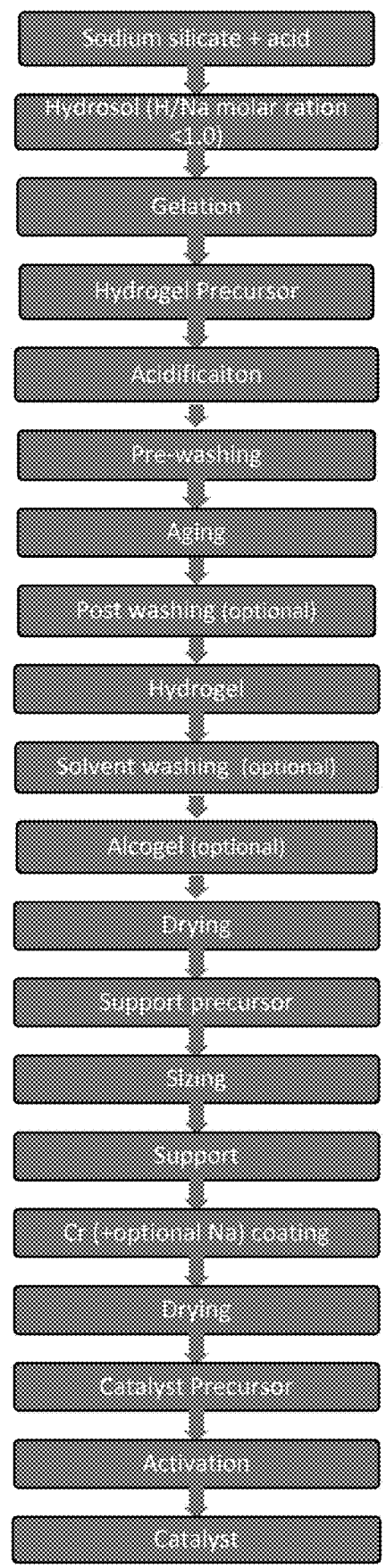
FIG. 1 is a flow chart showing the general steps used in a base-set gel process for making silica support and Cr/Silica catalyst according to an embodiment of the present disclosure.

The silica gels used herein are described as either "acid-set gels" or "base-set gels." Both types of gels are produced using a silicate, such as a sodium silicate, and a mineral acid such as sulfuric acid via an acid-base reaction.

An "acid-set gel" is a gel formed by the acid-base reaction that is not stoichiometric but utilizes more acid than base, such as a greater volume or weight percent of acid.

A "base-set gel" is a gel formed by the described acid-base reaction that is not stoichiometric but utilizes more base than acid, such as a greater volume or weight percent.

As used herein, "Cr-only catalyst" refers to a catalyst without other added multivalent metal of oxidation state of +3 or higher.

The term "composition" is sometimes referred to as "catalyst composition" and is meant to describe an unactivated catalyst precursor, as well as a catalyst that has been activated. For example, after Cr impregnation/drying, the product typically contains a Cr compound with Cr in +3 oxidation state. This product is a catalyst precursor as it is not catalytically active for ethylene polymerization. This catalyst precursor has to be activated in oxidative atmosphere (such as heating in fluidized bed reactor in dry air) to convert Cr from +3 to +6 oxidation state. The activated product is more accurately referred to as the catalyst.

As used herein, "cold water wash" refers to wash water having a temperature of 55° C. or less.

As used herein, "hydrosol" refers to a mixture of metal silicate and acid in liquid form.

As used herein, "hydrogel precursor" refers to an unwashed and/or unaged hydrogel.

As used herein, "hydrogel" refers to a washed and aged hydrogel.

As used herein, "alcogel" refers to a hydrogel that is further washed with an organic solvent to make the hydrogel substantially free of water, such as by replacing water in the hydrogel with alcohol.

As used herein "dried gel" which is also known as a "support precursor" refers to a dried gel before sizing. "Support" refers to dried gel after sizing.

As used herein, "melt index" (MI) and "high load melt index" (HLMI) are measures of the molten polymer fluidity, and are inversely related to the molecular weight, as measured in accordance with ASTM D-1238-4 using loads of 2.16 kg and 21.6 kg respectively at 190° C.

"MI potential" of a Cr catalyst described herein is a function of, and is directly proportional to, the MI of the polymer produced from that catalyst. For example, when a Cr catalyst activated under specified temperature is used to polymerize ethylene under specified polymerization conditions, MI potential of the Cr catalyst is directly proportional to the MI of the polymerized ethylene. The higher the MI of the polymer, the higher the catalyst MI potential.

Density of the described polymers is measured by the procedure of ASTM D-792-13.

The MI, HLMI and density are measured on polyethylene pellets, which are obtained by processing stabilized polymer powders using a single screw extruder under nitrogen.

The levels of chromium in the catalyst composition are measured by X-ray fluorescence ("XRF"), using a PANalytical Magix Pro Automatic Sequential Spectrometer. Samples are calcined at 1000° C. in air and then prepared as fused beads using a lithium borate flux. Fusion is typically between 1000° C. and 1250° C. Cr level is reported as the weight percentage of the catalyst precursor after calcination at 1000° C.

The levels of Na and Al in the catalyst compositions are measured by Atomic Adsorption Spectroscopy (AA) using a Perkin-Elmer Analyst 100 Spectrometer and Inductively Coupled Plasma ("ICP") Spectroscopy using an ACTIVA™ HORIBA Jobin Yvon ICP-AES spectrometer, respectively. Samples of catalyst precursor are digested with hydrofluoric acid (HF). The resulting silicon tetrafluoride (SiF$_4$) is fumed away and the residue is analyzed for Na and Al. Na and Al levels are reported as the parts per million of the catalyst precursor after drying at 120° C.

The surface area and pore volume are measured by Nitrogen Porosimetry using an Autosorb-6 Testing Unit from Quantachrome Corporation. Samples are first outgassed at 350° C. for at least 4 hours on the Autosorb-6 Degassing Unit. A multipoint surface area is calculated using BET theory taking data points in the P/P$_0$ range 0.05 to 0.30. A pore volume measurement is recorded at P/P$_0$ of 0.984 on the desorption leg. Average pore diameter is calculated using the following equation assuming cylindrical $$\text{Average pore diameter(Å)} = \frac{4000 \times PV\left(\frac{cc}{g}\right)}{SA\left(\frac{m^2}{g}\right)}$$

The particle size is measured by laser light scattering using an apparatus such as a Malvern Mastersizer™ model 2000. This instrument utilizes Mie theory to calculate the particle size distribution. Mie theory predicts how light is scattered by spherical particles and takes into account the refractive index of the particles. The real value used for silica refractive index is 1.4564 and the imaginary value is 0.1. The refractive index for the water dispersant is 1.33.

As resin properties are determined by the catalyst properties and polymerization conditions, to be able to control resin properties, there is a need to control catalyst design. The catalyst support typically acts as a dispersing agent for the active Cr centers, and directly affects the resulting polymer characteristics. Surface area (SA), pore volume (PV), and pore size distribution of the catalyst may affect the resulting polymer. Other things being equal, higher pore volume (thus larger pore) $Cr/SiO_2$ catalysts produce polymers with a lower MW and higher MI.

In one embodiment, the base-set gel described herein, and which comprises a low-Al content, results in a Cr/silica catalyst having a higher MI potential than a base-set gel with a higher Al impurity content but at the same Na content. In addition, the Inventors have discovered that regardless of the Al impurity content, a Cr/silica catalyst having an increased Na content in general leads to higher MI potential. It was also discovered that using a Na content that is too high (for example when the Al impurity content is high), will cause catalyst sintering at the given activation temperature, typically 750-850° C. Thus, it is desirable to keep the Al impurity level as low as possible. As described in the Background section, and one skilled in this art would appreciate, this is generally not the norm. Rather, traditional base-set gel processes in general lead to gels with higher Al impurity content.

Commercial silica gel production typically uses sodium silicate such as sodium silicate with $SiO_2:Na_2O$ weight ratio of 3.2, and a mineral acid such as sulfuric acid via an acid-base reaction. For commercial production, however, the acid-base reaction is almost never stoichiometric—either more acid is used (in this case the gel formed is called an acid-set gel) or less acid is used (in this case the gel formed is called a base-set gel). Base-set gel process is widely used for commercial silica gel manufacturing as the process is conducive for making silica gel particles of spherical shape and with particle size ranging from tens of microns to several millimeter size. Commercial sodium silicate is produced from sand, which typically contains various multivalent cations, such as Al, as impurities. When gel is formed under basic pH (as in the case of base-set gel), these multivalent cations tend to substitute a small fraction of the Si atoms in the $SiO_2$ gel framework thus are "locked" into the gel structure tightly. Consequently base-set process typically produces gel of lower purity than the corresponding acid-set gel. As high purity sand supply is becoming less and less commercially available, it is important that a process is developed to allow the production of base-set gel of high purity.

In view of the foregoing, there is disclosed herein a catalyst composition having a support with defined levels of Na and Al, that results in a Cr/Silica catalyst of increased MI potential. While not wishing to be bound by theory, it is believed that both acid sites and base sites in the silica supports (thus catalysts) increase the MI potential of Cr/Silica. Na introduces base site whereas Al introduces acid site. When both Na and Al are present, they can cancel each other's effects due to acid-base neutralization.

In various embodiments, there are disclosed Cr/Silica catalyst compositions in which the silica support has an Al content of less than 50 ppm, such as less than 25 ppm, or even an amount ranging from 10-40 ppm of the catalyst composition.

There are also disclosed Cr/Silica catalysts in which the silica support has a Na impurity less than about 800 ppm, for example, the final catalyst composition can comprise Na in an amount ranging from 50 to 800 ppm, from 200 to 800 ppm, or 200 to 700 ppm such as less than about 600 ppm, or even an amount ranging from about 50-600 ppm of the catalyst composition.

There are also disclosed Cr/Silica catalyst compositions in which the Na:Al molar ratio is greater than 5, greater than 10, greater than 20, even greater than 30, such as a molar ratio ranging from 10-40.

As described herein, the catalytically active metal comprises Cr, which may be added to the silica support using at least one Cr compound. In one embodiment, the chromium compound is a chromium oxide or a compound which can be converted to chromium oxide by calcination. For example, the chromium-containing compound may be a water-soluble compound or an organic solvent soluble compound. Non-limiting examples include chromium acetate, nitrate, sulfate, acetylacetonate, chromium trioxide, ammonium chromate, tert-butyl chromate and other soluble chromium compounds.

In making the catalyst described herein, sufficient amounts of at least one of the described chromium-containing compounds should be employed so that the catalyst contains Cr in an amount ranging from 0.01 to 3 wt. %. In certain embodiments, the catalyst contains Cr in amount ranging from 0.1 to 2 wt. %, such as in an amount ranging from 0.25 to 1.5 wt. %.

In one embodiment, there is disclosed a process for preparing a catalyst composition comprising a Cr coated support with particularly defined levels of Na and Al. The method comprises reacting a metal silicate, such as sodium silicate with an acid to form a hydrosol which subsequently solidifies into a hydrogel precursor. As the sodium silicate comprises Al as an impurity, the method further comprises treating the hydrogel precursor to reduce the amount of Al impurity and to form a hydrogel. Therefore, in a broader sense, there is described a method comprising making a gel and Al leaching it to reduce the Al to a desired level.

As previously described, the Al is adjusted in the silica support to achieve an amount less than 50 ppm of the catalyst composition, such as an amount less than 25 ppm. In one embodiment, Al is adjusted in the silica support to achieve an amount ranging from 10-40 ppm of the catalyst composition. In one embodiment, a high purity silicate that has a very low Al content may be used. This could eliminate the need to treat the hydrogel precursor to remove Al, assuming the Al content level in the silicate is sufficiently low. However, high purity silicate can be expensive and is not readily available.

The method described herein may also be performed to adjust the Na content in the final catalyst composition to an amount less than 800 ppm of the catalyst composition. In certain embodiments, the final catalyst composition includes amounts of Na ranging from 50 to 800 ppm, from 200 to 800 ppm, or 200 to 700 ppm such as less than about 600 ppm, or even an amount ranging from about 50-600 ppm of the catalyst composition.

The resulting Na:Al molar ratio is typically adjusted to a value as described herein.

In one embodiment, the method further comprises ageing the hydrogel precursor to form a hydrogel having a surface area greater than 200 $m^2/g$, or greater than 250 $m^2/g$ or such as about 300 $m^2/g$, wherein ageing comprises mixing the hydrogel precursor with a neutral or basic solution to form an aqueous dispersion having a pH of at least 6, such as about 8-9 and at a temperature ranging from 70-100° C. for a time ranging from 4-36 hours.

The method may further comprise drying the gel, using any common techniques known in the industry, such as spray drying, flash drying or a solvent-wash/drying technique, to produce a dried gel (support precursor). The method may also comprise a post-drying step, such as milling, sieving and/or classifying the precursor into support of desired particle size distribution which is subsequently impregnated with a chromium compound to form a Cr on silica catalyst. The process of adjusting the Na content of the catalyst may be performed before or during the impregnation step to achieve Na in an amount of less than 800 ppm of the catalyst composition, such that the amount of Na is adjusted to achieve a Na:Al molar ratio greater than 5, greater than 10, greater than 20, even greater than 30, such as a molar ratio ranging from 10-40.

In one embodiment, there is described a process for making a base set gel and catch gel in acid water. In particular, the reaction product of the sodium silicate and acid is a basic hydrosol having an $H_2SO_4:Na_2O$ molar ratio typically ranging from 0.7 to 0.95. The method of treating the basic hydrogel precursor to reduce the amount of Al impurity may comprise a bead process. For example, the bead process comprises spraying the basic hydrosol into the air to solidify it into beads, and catching the beads in an acidic solution to provide a gel dispersion of pH less than 2, such as less than 1 and at temperature lower than ~60° C., such as lower than 55° C. The gel is soaked in this acidic solution for a period of no less than 2 hours.

Applicants have discovered that temperature and pH have pronounced influence on leaching characteristics, and report herein how the leaching characteristics is affected by temperature.

Figure 2:
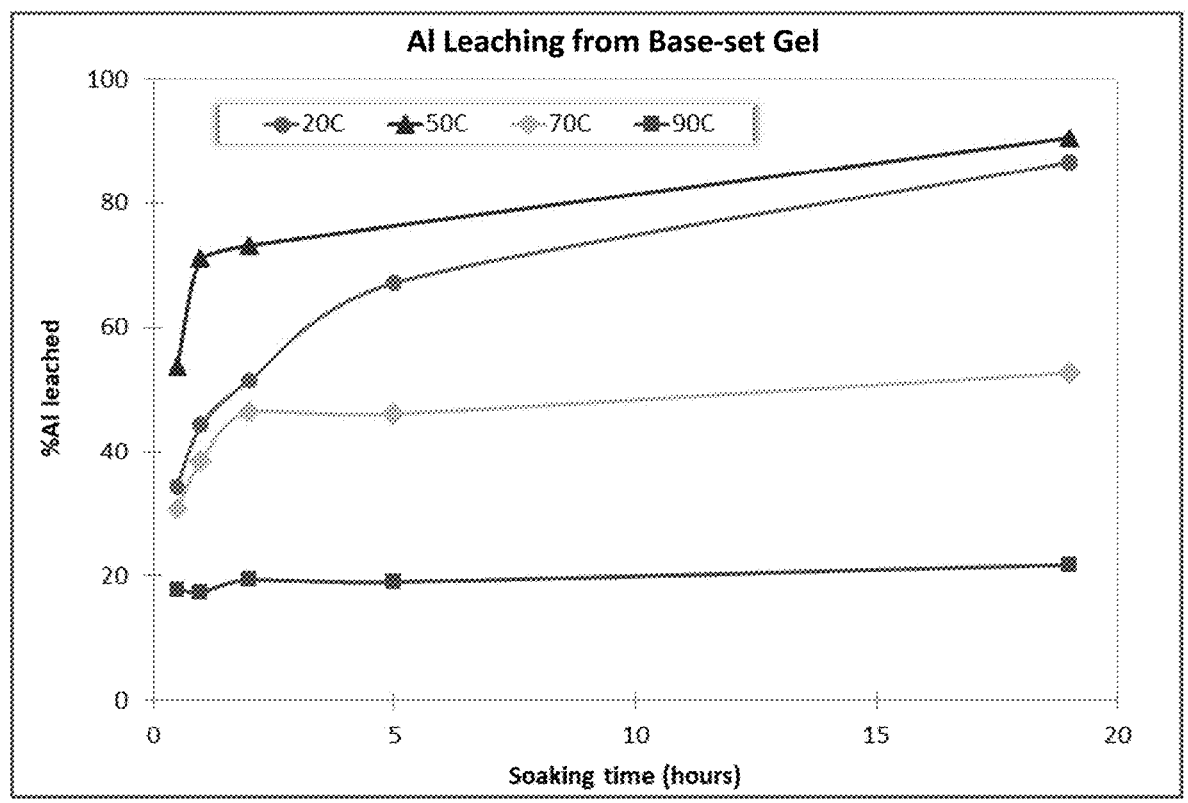
FIG. 2 is a graph comparing Al leaching profile for hydrogel precursors soaked in acid water at temperatures ranging from 20 to 90° C. for the process shown in FIG. 1. The total amount of acid, including acid used for gel forming and acid for acidification before soaking, is about 20% in excess of the Na$_2$O in sodium silicate used for gel forming.

Temperature: Al leaching at acidic pH was shown to be particularly sensitive to temperature, with leaching preferably done at 60° C. or below, such as 55° C. or below. As shown in FIG. 2, among the four temperatures studied (20° C., 50° C., 70° C. and 90° C.), leaching was least efficient for 90° C. and not very efficient for 70° C. Extended time does not improve leaching at these temperatures. Leaching was found to be most efficient at 50° C. within the time period studied. Without being bound by any theory, it is presumably due to faster kinetics at 50° C. than at 20° C. Leaching at 20° C. is not as efficient as at 50° C. within the time period studied but looks like it can leach out more Al if given longer time. While not being bound by any theory, at equilibrium % Al leached is shown to improve with lower temperatures but higher temperature is preferred for kinetic consideration.

pH: In an embodiment, the pH should stay below ~3-4 until most of the Al impurity is removed from the system, not just from the gel but also from the liquid phase that is in contact with the gel. At pH above 3-4, Al will redeposit onto the silica surface. Accordingly, a pH<2, such as <1 is desirable for Al leaching from the gel structure into the liquid phase, but to prevent Al redeposits onto silica surface, pH of the liquid phase should be kept at <3-4 until the liquid phase is substantially free of the leached Al. In one embodiment, washing in water acidified to a pH ~3 at ambient temperature maybe the best way to reduce the residual Al content to the lowest level. However, this lower temperature extends the wash time which is not desirable for commercial production. For the sake of cost control, washing can be done at higher temperature (<60° C.) for the entire washing, or at least for the first several hours to remove the majority of the leached Al then washed at even higher temperature. If more acid is used for acidification prior to pre-washing, washing can be done with neutral water as well. As previously described, the pH of the gel/water dispersion should not exceed pH 3-4 before the majority of the leached Al is removed from the dispersion.

While soaking and pre-washing may be performed as separate steps, in an embodiment, soaking and pre-washing can also be combined. For example, if the pre-washing is done at pH ~2 or less and at temperature <60° C., it has the same effect as soaking, and can be more efficient than soaking, depending if and how often the liquid phase is refreshed.

In one embodiment, the beads caught in the acidic solution are subsequently washed in water acidified to a pH ~3 at ambient temperature, prior to aging in water that is pH adjusted to 8-9 using aqueous $NH_4OH$ and at 70-90° C. for 4-36 hours to achieve a gel having a surface area greater than 200 $m^2/g$, or greater than about 250 $m^2/g$, such as about 300 $m^2/g$.

Optionally the gel can be washed again after aging to further reduce alkali and alkaline earth metal impurities. To facilitate the removal of alkali and alkaline earth metals, the pH of the aged hydrogel can be lowered to approximately 2 and the silica hydrogel can be washed with neutral water or in an embodiment, water acidified to a pH ~3.

The hydrogel can be dried by one of the techniques known to the art. One suitable method is flash drying. Another suitable method is spray drying. Another suitable method is washing the hydrogel with an organic solvent and subsequently drying the gel under vacuum. The dried gel is sized to the desired particle size distribution to form silica support.

As mentioned, the amount of Al and Na affects the MI potential of the resulting catalyst. Therefore, the method further comprises adjusting the Na content of the catalyst before, for example by adjusting washing process, or during the impregnation step to achieve Na in an amount less than 800 ppm of the catalyst composition, and Na:Al molar ratio as described herein.

In an embodiment, there is disclosed a method for preparing a composition comprising: reacting a sodium silicate comprising Al as an impurity, with an acid to form a hydrosol; allowing the hydrosol to form a gel precursor; treating the gel precursor to reduce the amount of Al; aging the gel precursor to form a hydrogel having a surface area greater than 200 $m^2/g$, such as 300 $m^2/g$, wherein ageing comprises mixing the gel precursor with a neutral or base solution to form a hydrogel having a pH of at least 6; and drying to produce a dried gel that is then impregnated with a chromium compound to form a Cr on silica catalyst composition. There are a number of optional processing steps that can be used including milling the hydrogel to form particles of a desired size, or sieving/classifying the dried gel to produce support of desired particle size distribution.

Particles of catalyst precursor according to the present disclosure may have a d90 (diameter at which 90% by volume of the particles have a diameter less than) of 500 μm or less, for example 400 μm or less. In certain embodiments, the particles may have a d50 of 300 μm or less. The particles may also have d10 of 1 μm or more, for example 10 μm or more. In certain embodiments, the particles have a d50 from 1 to 300 μm, from 5 to 250 μm or from 25 to 150 μm. The particles may be prepared by comminution combined with size classification by means such as sieving or air classification, or the particles may be prepared by a route such as spray-drying followed by size classification.

An ethylene polymerization catalyst is obtained or obtainable from the compositions described herein by heating a catalyst precursor composition in a non-reducing atmosphere, such as an oxidizing atmosphere, at a temperature from 200 to 1200° C. for an activation period from 30 minutes to 15 hours, such as from 400 to 850° C. from about 4 hours to 12 hours.

The resins produced by the catalysts described herein are particularly suitable for small blow molding applications. As previously mentioned, in order to use the disclosed catalysts to produce resins, the catalysts must first be activated using a thermal step, such as in a fluidized bed reactor. In one embodiment, the catalyst can be activated in a fluidized bed reactor in dry air, such as at a temperature ranging from 750 to 850° C., for example at 800 to 850° C. for a time ranging from 30 minutes to 15 hours, such as 6 hours.

The methods according to the present disclosure are applicable in the preparation of polyethylene and copolymers of ethylene in which combined ethylene is present in an amount of at least 25 mole percent, such as at least 50 mole percent, or at least 75 mole percent. Copolymers can be prepared from mixtures of ethylene, and one or more C3 to C8 α-alkenes.

The features and advantages of the catalysts and methods disclosed herein are illustrated by the following examples, which are not to be construed as limiting the scope of the present disclosure in any way.

EXAMPLES

Examples 1 and 2 below describe base set gels having low Al content that are prepared from standard purity and high purity sodium silicate, respectively.

Example 1: Preparation of Base Set Gel of Low Al Content from Standard Purity Sodium Silicate A base-set gel process for producing silica support for a Cr on Silica catalyst according to the present disclosure is provided herein. This process started from a sodium silicate that contained Al as an impurity. Through a series of steps, shown in the flow chart of FIG. 1, the Al and Na content were reduced to acceptable levels and ratios in the resulting catalysts.

The dilute sodium silicate solution of 3.3 weight ratio $SiO_2:Na_2O$ was first reacted with dilute sulfuric acid to form a hydrosol having the following composition: 12 wt. % $SiO_2$; $H_2SO_4:Na_2O$ in a molar ratio of 0.8. The sodium silicate solution contains about 400 ppm Al on $SiO_2$ weight basis. As a result, the resulting hydrosol was basic.

The hydrosol was sprayed into air, where it broke into droplets and solidified into beads having a diameter of several millimeters before caught in a solution. Unlike traditional bead processes, which utilize water or a solution that buffers the pH of the beads/solution system at a basic pH (such as aqueous solution of ammonium sulfate, sodium bicarbonate, etc.)—used to prepare Comparative catalyst 1—this inventive process for producing gel with reduced Al content used an aqueous solution of acid to catch the beads. Therefore, the total acid used for bead forming according to this example, including acid in the catch solution, led to an $H_2SO_4:Na_2O$ molar ratio of about 1.2 and a gel dispersion of pH<1. Hydrogel precursor beads were soaked in this acid solution at ambient temperature for hours.

The beads were washed with water that was acidified to a pH ~3 at ambient temperature, which resulted in the beads being substantially free of Na and Al. After the washing step, aqueous $NH_4OH$ was then added to the solution to raise the pH to ~9. Aging was conducted at 70° C. for about 16 hours to achieve a gel having a surface area of about 300 m²/g.

Acid was then added to lower the pH to ~2. The beads were then washed with water that was acidified to a pH ~3. The beads were further washed with methanol to substantially free of water (such as <2 wt % water) and dried to produce support precursor, and subsequently sized to d50 of about 100 μm to generate a support.

Comparative catalyst 1: this catalyst was a silica support comprising approximately 330 ppm Al and 40 ppm Na prepared from the traditional base-set bead process and which was impregnated with 1 wt % Cr using a methanol solution of chromium acetate.

Catalyst A: this catalyst was a silica support modified according to this invention, to generate a support with low Al content, ~20 ppm, and Na content, ~16 ppm. This support was impregnated with 1 wt % Cr using a methanol solution of chromium acetate.

Catalyst B: this catalyst was the same silica support for Catalyst A but was impregnated with 1 wt. % Cr and about 400 ppm Na using a methanol solution containing chromium acetate and sodium formate. Properties of Comparative Catalyst 1, and Inventive Catalysts A and B are provided in Table 1.

TABLE 1

| Catalyst properties | | | | | | | |
|---|---|---|---|---|---|---|---|
| Catalyst | SA (m2/g) | PV (cc/g) | APD (Å) | Cr (wt %) | Na (ppm) | Al (ppm) | Na/Al Ratio |
| Comparative 1 | 279 | 2.49 | 357 | 0.95 | 40 | 330 | 0.1 |
| Catalyst A | 321 | 2.66 | 331 | 0.95 | 16 | 19 | 1.0 |
| Catalyst B | 317 | 2.62 | 331 | 0.96 | 420 | 19 | 26 |

These catalyst samples were evaluated for both homo- and co-polymerization. For homo-polymerization, about 10 g of catalyst was activated in a fluidized bed reactor in dry air. The temperature was held at 850° C. for 6 hours before cooling. Air was switched to nitrogen at 300° C. About 0.17 g of activated catalyst was charged into a 2.5 L slurry polymerization reactor. Polymerization was conducted with 10 mol % ethylene in isobutane at 102° C. Polymerization reaction was terminated when about 425 g polyethylene was produced. For co-polymerization, catalysts were activated similarly except at 815° C. Polymerization was also done similarly except at 100° C. and with 5 mL 1-hexene.

Figure 3:
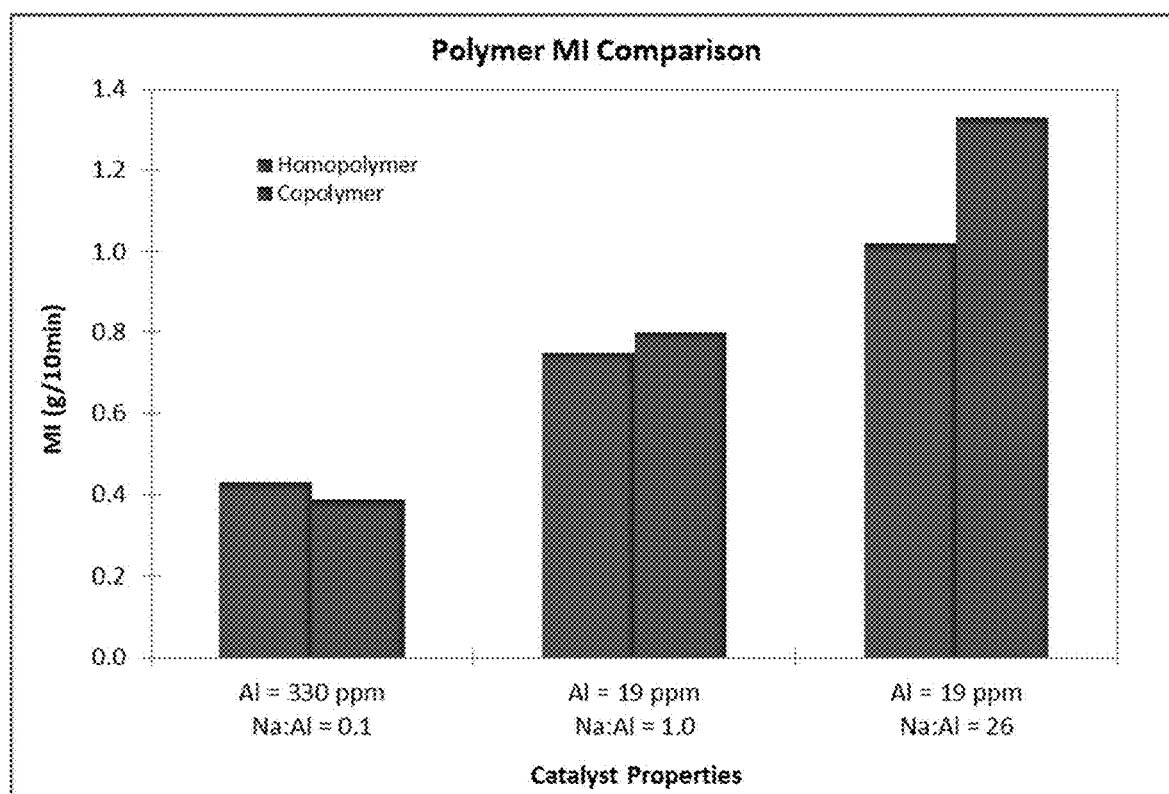
FIG. 3 is a graph comparing melt index (MI) for homo and copolymers prepared from Cr/Silica catalysts having various Al content and Na:Al ratios made according to the process described in FIG. 1.

Polymerization results are summarized in Table 2 below. As evident, there is a substantial increase in polymer MI when the Al content of the catalyst is decreased from 330 ppm to 19 ppm. There is a further substantial increase in polymer MI when the catalyst Na:Al molar ratio is increased from 1 to 26 for the catalysts with low Al content. See, for example, FIG. 3, showing a plot of MI results.

TABLE 2

| Polymerization evaluation results | | | | | |
|---|---|---|---|---|---|
| Polymerization | Catalyst | Activity (g/g/h) | MI (g/10 min) | HLMI (g/10 min) | Density (g/cc) |
| Homo- | Comparative 1 | 2227 | 0.43 | 31.4 | 0.9638 |
|  | Catalyst A | 2315 | 0.75 | 54.5 | 0.9651 |
|  | Catalyst B | 2285 | 1.02 | 67.6 | 0.9652 |
| Co- | Comparative 1 | 2231 | 0.39 | 26.7 | 0.9558 |
|  | Catalyst A | 2863 | 0.80 | 51.8 | 0.9569 |
|  | Catalyst B | 3247 | 1.33 | 88.7 | 0.9580 |

Example 2: Preparation of Base-Set Gel of Low Al Content from High-Purity Sodium Silicate This Example describes methods that were used to prepare both inventive and comparative supports. The process used to make these different supports is the same except that the inventive support was made using high purity sodium silicate from PQ (tradename CRYSTAL® FS).

The high purity silicate used to prepare the inventive support contains ~20 ppm Al on SiO₂ weight basis. Beads formed with 12% SiO$_2$ and H$_2$SO$_4$:Na$_2$O molar ratio 0.8 and were caught in ammonium sulfate solution. Aging was conducted at 70° C. for 16 hours. Beads were then acidified to pH ~2 and washed with water acidified to pH ~3. Hydrogel beads were subsequently washed with methanol and dried under vacuum, milled/classified to the desired particle size distribution.

Comparative 2 was prepared the same way as Comparative 1 except it was made from a different batch of preparation and a different batch of silicate, e.g. a sodium silicate of normal purity. For the comparative support, the sodium silicate used is PQ's N-clear silicate and it typically contains 300-400 ppm Al on SiO$_2$ weight basis.

Catalyst C is prepared the same way as Comparatives 1 and 2 except from support prepared from high-purity silicate as described above.

Catalyst D was prepared the same way as Catalyst C except that a small amount of Na formate was added to the Cr coating solution during catalyst preparation. Catalyst properties and polymerization evaluation results are summarized in Table 3 and Table 4, respectively. Polymerization evaluation was conducted the same way as Example 1 except that homo-polymerization was performed at 107° C. instead of 102° C.

TABLE 3

Catalyst properties

| Catalyst | SA (m2/g) | PV (mL/g) | APD (Å) | Cr (wt %) | Na (ppm) | Al (ppm) | Na/Al Ratio |
|---|---|---|---|---|---|---|---|
| Comparative 2 | 290 | 2.95 | 408 | 0.96 | 106 | 226 | 0.6 |
| Catalyst C | 305 | 2.75 | 361 | 0.94 | 94 | 22 | 5.0 |
| Catalyst D | 306 | 2.75 | 359 | 0.95 | 459 | 24 | 22 |

TABLE 4

Polymerization evaluation results

| Polymerization | Catalyst | Activity (g/g/h) | MI (g/10 min) | HLMI (g/10 min) | Density (g/cc) |
|---|---|---|---|---|---|
| Homo- | Comparative 2 | 2523 | 1.6 | 84.1 | 0.9646 |
| | Catalyst C | 2833 | 2.6 | 132.0 | 0.9657 |
| | Catalyst D | 2438 | 3.3 | 159.5 | 0.9658 |
| Co- | Comparative 2 | 3033 | 0.23 | 21.2 | 0.9538 |
| | Catalyst C | 3307 | 0.50 | 43.6 | 0.9547 |
| | Catalyst D | 3303 | 0.59 | 52.0 | 0.9548 |

As shown in Tables 3 and 4, catalyst with low-Al (Catalysts C and D) leads to polymer with higher MI (than Comparative 2). Also, the data shows that increasing the Na:Al ratio further increases polymer MI.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

Other embodiments of the catalysts and methods of the present disclosure will be apparent to those skilled in the art from consideration of the specification and practice of the embodiments disclosed herein. It is intended that the specification and examples be considered as exemplary only, with the true scope of this application being indicated by the following claims.

What is claimed is:

1. A method for polymerizing ethylene with a catalyst comprising: a silica-containing substrate derived from a base-set gel, the silica-containing substrate comprising: a catalytically active metal comprising Cr; Al in an amount of less than 50 ppm of said catalyst; and Na in an amount of less than 800 ppm of said catalyst, the method further comprising:
activating the catalyst with one or more thermal steps to form an activated catalyst;
cooling the activated catalyst;
charging the activated catalyst in a polymerization reactor; and
polymerizing said ethylene above room temperature.

2. The method of claim 1, wherein the one or more thermal steps comprise heating the catalyst at a temperature ranging from 200 to 1200° C., for an activation period ranging from 30 minutes to 15 hours.

3. The method of claim 2, wherein the one or more thermal steps is performed in a fluidized bed reactor in dry air.

4. The method of claim 1, wherein polymerizing said ethylene results in the formation of polyethylene.

5. The method of claim 1, further comprising copolymerizing a mixture of ethylene and one or more C3 to C8 α-alkenes.

6. The method of claim 5, wherein said one or more C3 to C8 α-alkenes comprise 1-hexene.

7. The method of claim 1, wherein one or more thermal steps is performed in a fluidized bed reactor at a temperature ranging from 750 to 850° C.

8. The method of claim 1, wherein cooling the activated catalyst in an inert atmosphere comprises switching the atmosphere from air to nitrogen at 300° C.

9. The method of claim 1, wherein Al is present in the catalyst in an amount ranging from 10-40 ppm of said catalyst.

10. The method of claim 1, wherein Na is present in the catalyst in an amount ranging from 50 to 800 ppm of said catalyst.

11. The method of claim 1, wherein the Na:Al molar ratio is greater than 5.

12. The method of claim 11, wherein the Na:Al molar ratio ranges from 10-40.

13. The method of claim 1, wherein the catalyst has a surface area ranging from 250 to 400 m²/g.

14. The method of claim 1, wherein Cr is present in an amount ranging from 0.1-2.0% by weight.

15. The method of claim 1, wherein Cr is added from at least one compound chosen from chromium acetate, nitrate, sulfate, acetylacetonate, chromium trioxide, ammonium chromate, and tert-butyl chromate.

* * * * *